United States Patent [19]

Jackson

[11] Patent Number: 5,129,469

[45] Date of Patent: Jul. 14, 1992

[54] DRILL CUTTINGS DISPOSAL METHOD AND SYSTEM

[75] Inventor: James E. Jackson, Pearland, Tex.

[73] Assignee: Atlantic Richfield Company, Los Angeles, Calif.

[21] Appl. No.: 808,695

[22] Filed: Dec. 16, 1991

Related U.S. Application Data

[63] Continuation of Ser. No. 569,351, Aug. 17, 1990.

[51] Int. Cl.⁵ .......................... E21B 21/06; B09B 5/00
[52] U.S. Cl. ..................................... 175/66; 175/206; 175/207; 405/128
[58] Field of Search ................. 175/66, 88, 206, 207, 175/209, 217, 218; 405/128, 53

[56] References Cited

U.S. PATENT DOCUMENTS

| | | | |
|---|---|---|---|
| 2,919,898 | 1/1960 | Marwil et al. | 175/66 |
| 3,766,997 | 10/1973 | Heilhecker et al. | 175/66 |
| 3,774,702 | 11/1973 | Elenburg | 175/206 X |
| 4,222,988 | 9/1980 | Barthel | 175/66 X |
| 4,793,423 | 12/1988 | Knol | 175/66 |
| 4,913,245 | 4/1990 | Skinner | 175/66 |
| 4,942,929 | 7/1990 | Malachosky | 175/66 |

Primary Examiner—Stephen J. Novosad
Attorney, Agent, or Firm—Michael E. Martin

[57] ABSTRACT

Drill cuttings are disposed of by injection into a subsurface formation by way of an annular space formed in a wellbore. The cuttings are removed from the drilling fluid, conveyed to a shearing and grinding system that converts the cuttings into a viscous slurry with the addition of water. The system comprises a receiving tank and a centrifugal pump for recirculating the mixture of cuttings and water (seawater) between the pump and the receiving tank. A discharge conduit is connected to the pump for moving the viscous slurry to an injection pump for high pressure injection into the formation.

5 Claims, 1 Drawing Sheet

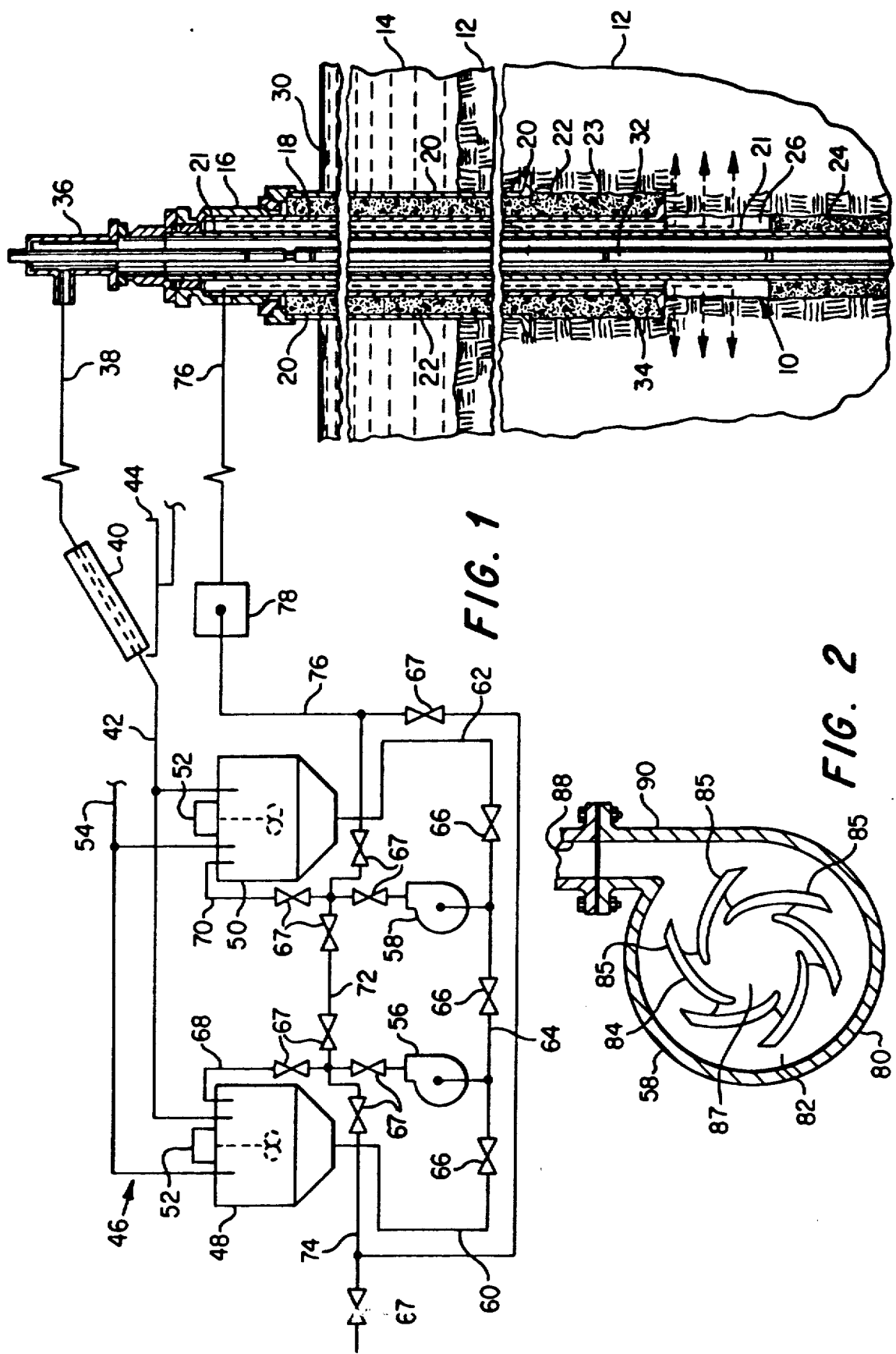

DRILL CUTTINGS DISPOSAL METHOD AND SYSTEM

This is a continuation, of application Ser. No. 07/569,351, filed Aug. 17, 1990.

BACKGROUND OF THE INVENTION

1. Field of the Invention

The present invention pertains to a drill cuttings disposal method and system wherein the cuttings are treated to form a slurry which is pumped into an earth formation through an annular area formed within a wellbore.

2. Background

The disposal of drill cuttings from drilling various types of wells has become an increasingly difficult problem due to restrictions imposed by various governmental authorities and the desire to minimize environmental damage. These problems are aggravated or at least amplified in certain well drilling operations, particularly in offshore drilling operations, wherein the disposal of drill cuttings normally requires transport of the cuttings to a suitable landfill or shore-based processing system.

One solution to drill cuttings disposal problems is disclosed and claimed in U.S. patent application Ser. No. 07/322,585 to Edward Malachosky, et al and assigned to the assignee of the present invention. In the system disclosed in the above-referenced application, drill cuttings are separated from the drilling fluid and reclaimed for use as construction grade gravel. Finer particles of material are slurried and injected into an earth formation through a disposal well. However, disposal of all of the drill cuttings, in many instances, is not as conveniently handled, particularly in offshore well drilling operations. It is to this end that the present invention has been developed with a view to providing a system and method for disposing of drill cuttings which are removed from the drilling fluid during the drilling process and are not suitable for reuse, reclamation or other disposal processes.

SUMMARY OF THE INVENTION

The present invention provides a unique method for the disposal of drill cuttings produced during the drilling of wells, particularly in offshore well drilling operations. In accordance with an important aspect of the present invention, drilling cuttings returned to the surface are separated from the drilling fluid, mixed with a suitable liquid, such as sea water, and circulated and sheared by a centrifugal type pump to reduce the cuttings particles to a size which forms a slurry-like composition which may be pumped into a selected zone in a wellbore for disposal.

In accordance with another aspect of the present invention, a method for disposal of drill cuttings is provided wherein the cuttings are separated from a drilling fluid, discharged into a holding and blending tank and recirculated to the tank by way of a centrifugal type pump of a particular configuration which advantageously reduces the size of the drill cuttings to a predetermined maximum so that the cuttings may form, with a suitable liquid such as sea water, a relatively viscous slurry which may be conveniently pumped into an annular area formed in a wellbore and into a formation zone which is suitable for the discharge of such a slurry.

In accordance with yet a further aspect of the present invention, there is provided a system which is advantageously used in conjunction with offshore well operations for receiving drill cuttings, reducing the size of the drill cuttings, and blending the drill cuttings with a suitable carrier liquid, such as sea water, so that a slurry-like composition may be pumped into a wellbore, preferably into and through an annular zone between the wellbore casing and an earth formation for fracturing and permeation into the formation. The system is particularly effective, compact and adapted for use in conjunction with offshore well drilling operations.

Those skilled in the art will recognize the above-described advantages and superior features of the invention together with other aspects thereof upon reading the detailed description which follows in conjunction with the drawing.

BRIEF DESCRIPTION OF THE DRAWING

FIG. 1 is a schematic diagram illustrating the drill cuttings disposal system of the present invention; and FIG. 2 is a view illustrating the configuration of one type of centrifugal pump preferred for use in conjunction with the present invention.

DESCRIPTION OF PREFERRED EMBODIMENTS

In the description which follows, like parts are marked throughout the specification and drawing with the same reference numerals, respectively. The drawing figures are not necessarily to scale and certain features may be shown in schematic form in the interest of clarity and conciseness.

Referring to FIG. 1, there is illustrated a wellbore 10 which has been drilled into an earth formation 12 below a body of water 14. The wellbore 10 is formed in a generally conventional manner by providing a wellhead 16 for supporting a casing string 18 which extends within the wellbore. A drive pipe 20 extends into the formation 12 and above the water surface 30 in support of the wellhead 16. Cement 22 occupies the annular space between the drive pipe 20 and the casing 18 as well as an annular area 23 between the formation 12 and the casing 18, as shown. A secondary casing or protection pipe 21 extends from wellhead 16 into the formation 12 and is cemented at a zone which has been packed with cement 24 and which leaves an annular area or space 26 between the cement 24 and the casing 18 which is delimited by the formation 12 and the protection pipe 22. A drillstem 32 is illustrated extending through the wellhead 16, the casing 18 and the protection pipe 21 to an open hole bottom portion of the wellbore, not shown, in a conventional manner.

In accordance with conventional drilling practice, drilling fluid is circulated from a source, not shown, down through the drillstem 32 and up through the annular area 34 formed between the drillstem and the pipe 22 to a return receptacle or bell nipple 36. The drilling fluid returning through the annulus 34 carries with it the earth particles or drill cuttings which, upon return to the surface, are conducted by way of a conduit 38 to a separating device commonly known as a shale shaker 40. Drill cuttings which are too large to be included in the drilling fluid for recirculation into the wellbore are separated by the shale shaker 40 and conducted by suitable conduit means 42 to a unique system for treating and disposing of the drill cuttings in accordance with the present invention. Drilling fluid and finer drill cuttings particles not separated by the shale shaker 40 are collected in a mud tank 44 and processed in accordance with conventional practices before reinjection of the drilling fluid down through the drillstem 32. Smaller drill cuttings not separated by the shale shaker 40 may be separated in conventional desanders, not shown, and added to a slurry to be described herein.

In accordance with the present invention, a unique system is provided for handling the separated drill cuttings, which system is generally designated by the numeral 46. The system 46 includes one or more storage and mixing tanks 48 and 50 which are each fitted with a suitable mixing device 52. The tanks 48 and 50 are also in communication with the shale shaker 40 by way of the conduit means 42 for receiving drill cuttings from the shale shaker. The tanks 48 and 50 are also in communication with a conduit 54 which is connected to a source of slurry carrier liquid which may be sea water. The system 46 also includes one or more centrifugal pumps 56 and 58 which are in circuit with the respective tanks 48 and 50 by way of suction conduits 60 and 62, respectively. In other words, material may be discharged from the tanks 48 and 50 by way of the conduits 60 and 62, respectively, directly to the inlet openings for the pumps 56 and 58. The conduits 60 and 62 are interconnected by a conduit portion 64 whereby either one of the pumps 56 and 58 may be placed in communication with the tanks 48 and 50. Suitable shut-off valves 66 are interposed in the conduits 60, 62 and 64 as illustrated. The pumps 56 and 58 are each connected to discharge conduits 68 and 70, respectively, for discharging fluid to the respective tanks 48 and 50 or to the other of the tanks by way of a cross-over manifold conduit 72. System discharge conduits 74, 75 and 76 are also provided for handling material which is ready for discharge from the system 46 for injection into the wellbore 10.

As illustrated in the schematic diagram of FIG. 1, the conduit 76 is in communication with a high pressure pump (usually a positive displacement pump) 78 which is connected to the wellhead 16 for discharging a slurry of drill cuttings in a liquid vehicle into the annulus 26 for injection into the earth formation 12, particularly in the zone between the bottom of the cement 22 and the top of the cement 24. Flow control over the fluid and ground drill cuttings discharged from the respective pumps 56 and 58 is accomplished by way of valves 67 which are interposed in the respective conduits as illustrated.

The type of centrifugal pump used for the pumps 56 and 58 is preferably of that illustrated in FIG. 2. Referring to FIG. 2, by way of example, the pump 58 is shown as having a generally cylindrical casing 80 with an interior impeller space 82 formed therein. The front of the casing 80 is removed to illustrate an impeller 84 of a backward swept blade type and having an open face on both sides, that is, over a major portion of the radial extent of the vanes, the blades or vanes 85 are swept backward with respect to the direction of rotation of the impeller and are not provided with opposed side plates forming a closed channel between the impeller fluid inlet area 87 and the blade tips. The casing 80 has a tangential discharge passage 88 formed by a casing portion 90. A preferred type of pump for use as the pumps 56 and 58 is that manufactured by TRW Mission Manufacturing Company, Houston, Texas under the trademark Magnum I. The concentric casing of these types of pumps as well as the configuration of the impeller blades is indicated to provide superior performance in regard to reducing the particle size of earth drill cuttings primarily by shearing action to as small as about 20 microns, when such particles are mixed with sea water and pumped through the pumps 56 or 58. The leading edge surfaces 85 of each of the vanes or blades 84 are preferably coated with an abrasion-resistant coating such as that provided under the trademark Superloy Cluster-Rite. Pump speed for the application of reducing drill cuttings size in accordance with the present invention is increased approximately fifty percent (50%) from the recommended pump speed for conventional applications.

In accordance with the present invention, drill cuttings are conveyed from the shale shaker 40 to one or both of the tanks 48 and 50 for mixing therein with a vehicle such as sea water which is provided through the conduit 54 to one or both of the tanks. By way of example, drill cuttings are discharged from the shale shaker 40 to the tank 50 and selected amounts of sea water are added to the tank 50 by way of the conduit 54. The pump 58 is operated to recirculate the drill cuttings-sea water mixture from the tank 50 by way of the conduit 62 and through the conduit 70 back to the tank. By adjustment of selected ones of the valves 67, the amount of material discharged from the pump 58 and recirculated to the tank 50 may be controlled to develop a slurry composed of clays which are sheared by the action of the pump 58 to provide fine particles and a relatively viscous fluid. Upon adjustment of the feed rate of discharge of drill cuttings into the tank 50 from the conduit 42 together with the sea water from the conduit 54, the slurry discharged from the pump 58 may be partially recirculated into the tank 50 and continually mixed with the raw in-feed from the conduits 42 and 54 or, discharged directly to the conduit 76 for injection into the annulus 26.

Alternatively, if recirculation of the cuttings-sea water mixture through one or more of the pumps 56 and 58 is required in order to provide the sheared clay particles and reduce the particle size, the system 46 may be operated such that a combination of the tank 48 with the pump 56 and the tank 50 with the pump 58 may be operated to recirculate a slurry of sea water and drill cuttings continuously until the particle size is reduced whereby the slurry is then transferred to the other tank and then injected directly into the annulus 26 by way of the conduit 76 and pump 78 while a fresh batch of cuttings and slurry water is loaded into the tank 48 for forming the slurry and reduction of the cuttings particle size. The mixers 52 may, of course, be operated substantially continuously to assist in forming and maintaining the viscous slurry of drill cuttings and water.

The method and system of the present invention described hereinabove provides a simplified way of disposing of earth drill cuttings heretofore unappreciated in the art. Although a preferred embodiment of a method and a system in accordance with the present invention have been described hereinabove, those skilled in the art will recognize that various substitutions and modifications may be made to the specific embodiments described without departing from the scope and spirit of the invention as recited in the appended claims.

What is claimed is:

1. A system for producing a slurry of finely ground solids and a carrier liquid suitable for injection into an earth formation and the like, said system comprising:

receiving means for receiving a quantity of said solids;

means for conducting said solids to said receiving means;

means for conducting said carrier liquid to said receiving means;

conduit means in communication with said receiving means for discharging a mixture of said solids and said carrier liquid from said receiving means; and centrifugal pump means connected to said receiving means for reducing the particle size of said solids so that a slurry of said solids and said carrier liquid may be prepared for injection into said space.

2. A method for disposing of solids particles into an earth formation through a wellbore penetrating said earth formation, comprising the steps of:

providing a system for generating a slurry formed of said solids particles and a carrier liquid, said system including means for reducing the particle size of said solids particles and means for conducting said slurry to an injection pump for injecting said slurry into said wellbore;

mixing said solids particles with said carrier liquid;

reducing the particle size of said solids particles to form a viscous fluid comprising said slurry; and conducting said slurry to said injection pump and injecting said slurry into said wellbore.

3. The method set forth in claim 2 wherein:

the step of reducing the particle size of said solids particles includes introducing a mixture of solids particles and carrier liquid to the inlet of pump means operating at a speed greater than said pump means is operated for pumping operations.

4. The method set forth in claim 2 wherein:

said system includes receiving tank means for said solids particles and said carrier liquid and conduit means for conducting a mixture of said solids particles and said carrier liquid between said receiving tank means and said means for reducing the particle size, and said method includes the step of mixing said carrier liquid and said solids particles in said receiving tank means and recirculating said mixture between said receiving tank means and said means for reducing said particle size.

5. A method for disposing of drill cuttings produced during the drilling of a well into a wellbore penetrating an earth formation, said earth formation forming a place for receiving a slurry comprising said drill cuttings and a carrier liquid, said method comprising the steps of:

providing a system for generating a slurry formed of said drill cuttings and said carrier liquid, said system including a centrifugal pump for at least partially reducing the particle size of said drill cuttings and means for conducting said slurry to an injection pump for injecting said slurry into said space;

circulating said slurry through said centrifugal pump to reduce the particle size of said drill cuttings; and conducting said slurry to said injection pump and injecting said slurry into said wellbore.

* * * * *